United States Patent [19]
Matsumoto

[11] Patent Number: 5,832,246
[45] Date of Patent: Nov. 3, 1998

[54] VIRTUALIZATION OF THE ISA BUS ON PCI WITH THE EXISTENCE OF A PCI TO ISA BRIDGE

[75] Inventor: John F. Matsumoto, Flores, Calif.

[73] Assignee: Toshiba America Information Systems, Inc., Irvine, Calif.

[21] Appl. No.: 759,866

[22] Filed: Dec. 3, 1996

[51] Int. Cl.$^6$ .............................. G06F 13/00; G06F 13/10
[52] U.S. Cl. ..................... 395/309; 395/308; 395/280; 395/500; 370/402
[58] Field of Search ...................................... 395/309, 308, 395/280, 281, 842, 500; 370/401, 402

[56] References Cited

U.S. PATENT DOCUMENTS

| | | | |
|---|---|---|---|
| 5,001,624 | 3/1991 | Hoffman et al. | 395/825 |
| 5,210,858 | 5/1993 | Jensen et al. | 395/552 |
| 5,333,276 | 7/1994 | Solari | 395/561 |
| 5,335,321 | 8/1994 | Harney et al. | 345/503 |
| 5,335,329 | 8/1994 | Cox et al. | 395/282 |
| 5,542,053 | 7/1996 | Bland et al. | 395/309 |
| 5,621,902 | 4/1997 | Cases et al. | 395/309 |
| 5,664,124 | 9/1997 | Katz et al. | 395/309 |
| 5,668,957 | 9/1997 | Davis et al. | 395/309 |
| 5,673,399 | 9/1997 | Guthrie et al. | 395/308 |
| 5,717,876 | 2/1998 | Robertson | 395/309 |
| 5,751,975 | 5/1998 | Gillespie et al. | 395/306 |

Primary Examiner—Gopal C. Ray
Attorney, Agent, or Firm—Banner & Witcoff, Ltd.

[57] ABSTRACT

The PCI bus cannot support devices such as a direct memory access controller. By providing virtualization hardware, a computer system can be fooled into believing that the device actually exists on the PCI bus. Thus, access signals sent to an incompatible device, for example a channel on a direct memory access controller, which does not exist on the PCI bus can be processed and returned by the virtualizing hardware as if the PCI bus supports the channel.

8 Claims, 2 Drawing Sheets

VIRTUALIZATION OF THE ISA BUS ON PCI WITH THE EXISTENCE OF A PCI TO ISA BRIDGE

FIELD OF INVENTION

The invention generally relates to a method and apparatus of virtualizing ISA (industry standard architecture) hardware devices that require DMA (direct memory access) accesses and, more particularly, to virtualizing hardware on the PCI (peripheral component interconnect) bus.

BACKGROUND OF INVENTION

Direct memory access (DMA) is a term that indicates that system buses are to be removed from control of a microprocessor in a host computer and are to be placed under control of a DMA controller. The DMA controller is typically used when bulk data transfers are to be made between system RAM (random access memory) and another data storage device. Examples of bulk data transfers include, but are not limited to, loading computer programs into RAM memory from an external source, transferring files from external disk storage into RAM memory, and transferring data from another computer into RAM memory. In instances such as these, provided that the saving of data-transfer time justifies the expense, it is advisable to allow the DMA controller to temporarily take control of the address and data buses from the microprocessor. Thus, a decision to employ a DMA controller is not merely a question of whether or not bulk quantities of data need to be transferred. It is a matter of whether the time saved in making the data transfer justifies the expense in using DMA hardware.

A DMA controller does not perform any task that the microprocessor cannot do itself. The microprocessor has available both I/O and memory data transfer instructions that allow it to move data. The choice of whether to use a DMA controller is a matter of efficiency. However, the DMA controller does not relieve the microprocessor so that it can do other tasks while the DMA controller is active. Rather the DMA controller, while active, replaces the microprocessor.

When a DMA is used, the DMA controller controls the address and the read and write signals for both the system RAM and the external data source. The DMA controller transfers the required number of data bytes and returns system control to the microprocessor. A DMA controller is programmable and may serve several channels. The DMA controller can be programmed to assign priority levels to each channel and to resolve priority conflicts between channels. External devices make requests to the DMA controller by sending signals on DMA request lines or channels. Each line is assigned a priority level that corresponds to its numerical designation. For example, line one has the highest priority, line two has the second priority, and line three has the lowest priority.

Even with a DMA controller chip controlling the actual movement of data, the microprocessor still must set up and oversee DMA transfers, tying up the chip throughout a bus transfer.

In the early days of PCS, the entire operation of an expansion bus was controlled by the microprocessor. The expansion bus is the electrical connector sitting at the bottom of an expansion slot, i.e., the space for an expansion board to be plugged into the system. A bus directly connected to the data and address lines of the host processor is referred to as a local bus.

Newer buses break the direct microprocessor connection by vesting the authority to control bus transfers in special logic circuits to make an arbitrated expansion bus. In the arbitrated bus design, the microprocessor surrenders its powerful position and becomes an equal to the expansion boards in the system. The microprocessor still maintains control of the bus transfers that it originates or receives, but it does not need to be involved in transfers between other devices in the system.

A device that takes control of the expansion bus to mediate its own transfers is a bus master and the device that receives data from the bus master is a bus slave.

In 1992 Intel introduced the PCI local bus specification. The PCI bus is not really appropriately characterized as a local bus. Rather, the PCI bus is more of a high-speed interconnection system a step removed from the microprocessor that runs closer to the speed of the microprocessor than the traditional expansion bus. The circuits and signals of the PCI design are independent of the requirements of a specific microprocessor or family. Thus, it has been referred to as a mezzanine bus instead of a local bus.

Before PCI, systems employed the ISA bus. It is desirable to use many of the devices used on ISA on PCI. For example, it would be beneficial if old sound cards and related devices compatible with ISA could be used on PCI. Unfortunately, old ISA sound cards are not currently compatible with PCI.

A record operation involving a sound card was implemented easily with ISA. An analog/digital converter receives sound input from a microphone and converts the input to digital information. The sound card makes a DMA request on the ISA bus. Responsive to the request, the DMA takes digital information from the sound card on the ISA bus and transfers it to the system memory. The playback operation performs the opposite transfer from system memory onto the ISA bus and to the sound card. The DMA again takes control of the processor and makes the transfer.

In a PCI system, a third party DMA is not supported, that is the PCI bus does not have a DMA. A third party DMA may be, for example, any Motorola DMA or an 8237-DMA or any other DMA known in the art. However, the third party DMAs are not compatible with the PCI master and thus do not comply with the PCI bus structure. Since PCI does not allow conventional DMA control, no DMA signals are allocated.

A PCI bus master can act like a DMA controller, but only to the extent that it can make transfers across the bus independently of the host microprocessor. However, many devices require third party DMA to interface with a host processor. The user may want to connect old sound cards which are not compatible with PCI to the host processor. However, since in a PCI system, there is no DMA controller, every device requiring direct memory access must have its own master capability. The PCI bus master cannot function as a third party DMA. Thus, it has not been possible to employ external devices incompatible with the PCI bus in a PCI system (e.g., where the device requires a third party DMA to interface with a host processor). Accordingly, there is a need in the art to make certain types of older devices, such as sound cards usable, compatible with PCI.

SUMMARY OF THE INVENTION

The present invention overcomes the disadvantages associated with the aforementioned PCI system by virtualizing (i.e., simulating) hardware on the PCI bus, for example, DMA hardware. Virtualization is useful where, for example, the hardware in a new machine does not have certain characteristics of the original hardware in original machines which are necessary for compatibility. In this instance, virtualizing hardware can be designed to act similarly to the missing original hardware without new software in the new machine recognizing the difference.

Thus, an advantage realized by the present invention is the ability to virtualize hardware of ISA hardware devices that require DMA accesses. In a PCI system, a third party DMA is not supported, that is the PCI bus does not have a DMA. According to the invention, DMA hardware is virtualized and accesses to the DMA that do not exist can be trapped by the virtualizing hardware. The virtualizing hardware permits operations to be carried out which are incompatible with the PCI bus. This ultimately allows, for example, sound cards and other devices which were not supported by the PCI bus to be utilized.

Further, conventional software and cards can be used to implement the virtualized hardware. The hardware that virtualizes a DMA, for example, coexists with the peripheral hardware that uses the DMA. For example, with a sound card, the virtualizing hardware can be placed on the sound card.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION

The present invention is discussed below with reference to virtualizing the ISA DMA controller on the PCI bus. However, the present invention may be applied to virtualizing any ISA devices on the PCI bus.

An ISA DMA controller has seven paired request/acknowledge DMA signal lines or fourteen signal lines for each slot or card. The ISA bus cannot share signal lines, i.e., channels. Thus, each channel must be programmed for a particular card or slot which requires DMA. In contrast, with PCI architecture, each card or slot has its own grant/request pin. Accordingly, there are no multiple DMA channels in PCI and PCI cannot support architectures which require multiple channels. Thus, the PCI is not compatible with the ISA DMA controller.

It would be advantageous to convert the ISA architecture to PCI to allow the ISA DMA controller to be used with the PCI bus. This is particularly beneficial to applications involving audio devices. Audio devices require hardware compatibility, for example with games, that cannot be directly connected to PCI. Thus, rather than making a PCI to ISA bridge, the present invention provides a PCI, not an ISA, device that uses direct memory access for hardware compatibility that connects directly to the PCI bus.

By providing virtualizing hardware, the ISA DMA controller is adapted to operate with the PCI bus. In particular, the virtualizing hardware forms part of an integrated circuit that can be directly attached to the PCI bus while maintaining backward compatibility with third party direct memory access software such as games. As a result, the hardware required to make a bridge integrated circuit chip is reduced. Thus, cost and space is reduced with the virtualizing hardware of the present invention over using a PCI to ISA bridge integrated circuit chip. Reducing space is particularly important with portable devices such as laptop computers.

For a PCI bus to be most useful, it must be compatible with expansion boards. Two levels of old-board compatibility are available, slot-level compatibility and system-level compatibility. Old-board compatibility indicates that old expansion boards, such as PC-style expansion boards used by systems like IBM's 1981 PC and 1984 AT, still have some usefulness. Slot-level compatibility ensures that old-boards plug into the same slot as boards that follow the standard employed by the host processor. System level compatibility means an old expansion board can be plugged into at least one slot in the computer system. Thus, with system level compatibility, old boards can be inserted into one or more slots inside the system dedicated to backward compatibility. However, with the present invention, no old expansion interfaces are needed. Rather the present invention provides an integrated circuit chip that may be directly attached to the PCI bus while maintaining backward compatibility with third party direct memory access.

Figure 1:
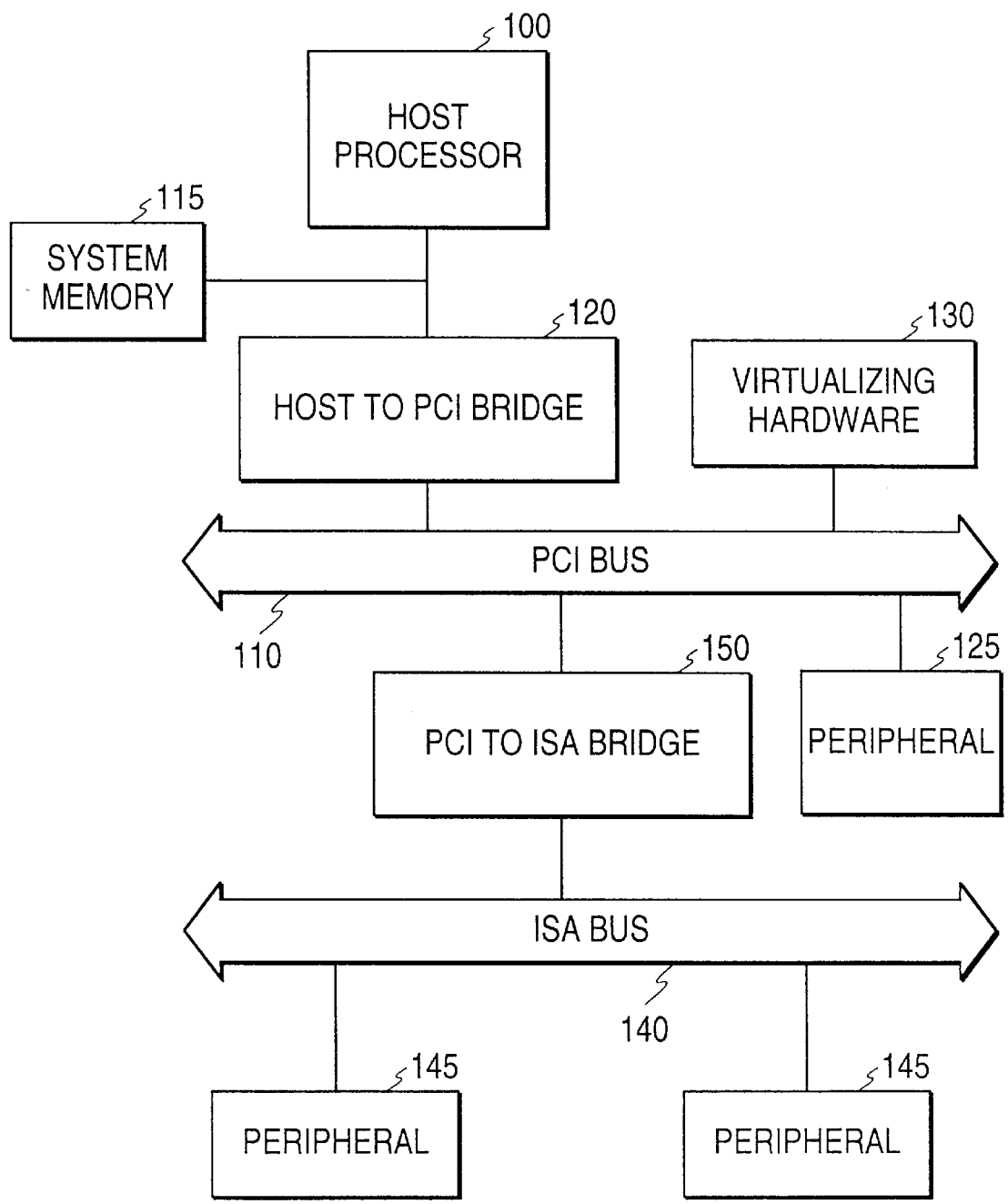
FIG. 1 is a block diagram of a PCI system according to the present invention.

An exemplary embodiment of the present invention is depicted in FIG. 1. A host processor 100 is coupled to a PCI bus 110 via a host to PCI bridge 120. The host processor may be any processor designed to be employed with PCI, such as a Pentium, 486, Pentium Pro, etc. System memory 115, according to the embodiment of FIG. 1, is connected to both the PCI bus 110 and host processor 100 via the host to PCI bridge 120. In an alternative embodiment, system memory 115 may be located between the host processor 100 and host to PCI bridge 120, wherein each of these three elements are interconnected with the same data lines.

The virtualizing hardware 130 is coupled to the PCI bus 110. The virtualizing hardware 130 coexists with the peripheral hardware that requires the DMA. For example, with a sound card, the virtualizing hardware 130 may be placed on the sound card. The key is that the virtualizing hardware 130 and the device requiring the DMA must be on the same slot. A DMA for another device in a different slot cannot be virtualized by the virtualizing hardware 130.

The PCI bus 110 is coupled to the ISA bus 140 via a PCI to ISA bridge 150. The ISA DMA controller is located in the PCI to ISA bridge 150.

An exemplary peripheral device 125 is coupled to the PCI bus 110, and two exemplary peripherals device 145 are coupled to the ISA bus 140. It is to be understood that one or more peripherals may be coupled to both the PCI bus 110 and ISA bus 140.

The virtualizing hardware acts in conjunction with a non-selective or subtractive scheme. An example of non-selective or subtractive decoding will be described with reference to FIG. 1 assuming the virtualizing hardware 130 is being used with a sound card.

In a typical system, when a host processor 100 attempts to access a device on either the PCI bus 110 or ISA bus 140, the access cycle travels through the host to PCI bridge 120 and appears on the PCI bus 110. If the cycle is not claimed by any device on the PCI bus 110, the cycle is then and only then claimed by the PCI to ISA bridge 150 and generated on the ISA bus 140 through the PCI to ISA bridge 150. Thus, when no device on the PCI bus 110 claims the access cycle, it defaults to the ISA bus 140. Normally, the chip that takes the cycle is the ISA DMA controller which according to an illustrative embodiment of the invention may be located in the PCI to ISA bridge 150.

A DMA channel to be virtualized is one of the DMA channels on the ISA DMA controller (e.g., an IBM 8237A-5). When the virtualizing hardware 130 of the present invention is coupled to the PCI bus 110, the normal scheme operates differently. When an access cycle appears on the PCI bus 110 and is not claimed by any device on the PCI bus 110, the virtualizing hardware 130 steals the access cycle and takes a peak at the data to determine whether it desires the data instead of the access cycle passing directly to the PCI to ISA bridge.

The virtualizing hardware 130 examines the data. For example, the virtualizing hardware might be emulating DMA channel one. Thus, the virtualized hardware looks for information to program DMA channel 1.

If the virtualizing hardware 130 does not want the data, a retry is issued. During the retry, the virtualizing hardware 130 does not claim the access cycle. Consequently, the access cycle passes through the PCI to ISA bridge 150 to the ISA DMA controller.

If the virtualizing hardware 130 determines that the information relates to DMA channel 1, it uses the information to simulate channel 1 of the DMA. The information tells the virtualizing hardware 130 where data is to be transferred. For example, a record operation may be occurring and data needs to be transferred from the sound card to the system memory 115. Then, the virtualizing hardware 130 generates a master cycle to become a PCI bus master, for example a virtual DMA, and takes the data from the sound card and places it in a desired location in system memory 115. That is, the virtualizing hardware 130 performs the function of the ISA DMA.

To mimic the third party (e.g., ISA) DMA, the virtualizing hardware 130 needs to be a PCI master and take over control of the PCI bus 110. Bus mastering with the PCI operates as follows. A bus master board or PCI master, or in this instance the virtualizing hardware 130, sends a request signal to the host processor 100 requesting control of the PCI bus 110. The PCI bus 110 starts to transfer data when it receives confirmation in the form of a grant signal from a central resource (i.e., the circuitry shared by all bus devices on the motherboard including bus control logic). Each PCI device including the virtualizing hardware 130 has its own dedicated request and grant signal. This allows great flexibility in assigning priorities in the computer system.

An example of the above described virtualization may be explained by the following sequence of events: 1) host processor 100 attempts to program the ISA DMA controller connected to the ISA bus 140; 2) PCI virtualizing hardware 130 recognizes the cycle as possibly a port (e.g., an I/O port or channel of DMA) which it has to take action on; and one of the following sequences, 3a) PCI virtualizing hardware 130 traps the access and identifies the data as unnecessary to the process; 4a) PCI virtualizing hardware 130 then issues a retry and the next access to the ISA DMA controller is ignored, allowing data to pass through to the ISA bus 140; 5a) end process; or 3b) PCI virtualizing hardware 130 traps the access and identifies the data as necessary to the process; 4b) PCI virtualizing hardware 130 processes or requests the master to write the modified data to the ISA DMA controller on the ISA bus 140, then as master, the task is performed that might be required of the ISA DMA controller; and 5b) end process.

Virtualizing DMA hardware does not require the host processor (e.g., X86 or Intel) to be in a protected mode, that is in a mode in which the process is not running and in which I/O and memory accesses are intercepted. In protected mode, to write to certain memory locations, there are certain priority levels. Virtualization can be carried out in both real and protected mode. In real mode (e.g., DOS), there is no protection and information can be read or written to any location.

According to the present invention, virtualization can be extended to include any bus system which uses non-selective or subtractive decoding to bridge one bus to another. In an illustrative embodiment of the present invention, only one channel of a DMA device on an ISA bus is being virtualized while the actual DMA on the ISA bus handles all other DMA channels.

Figure 2:
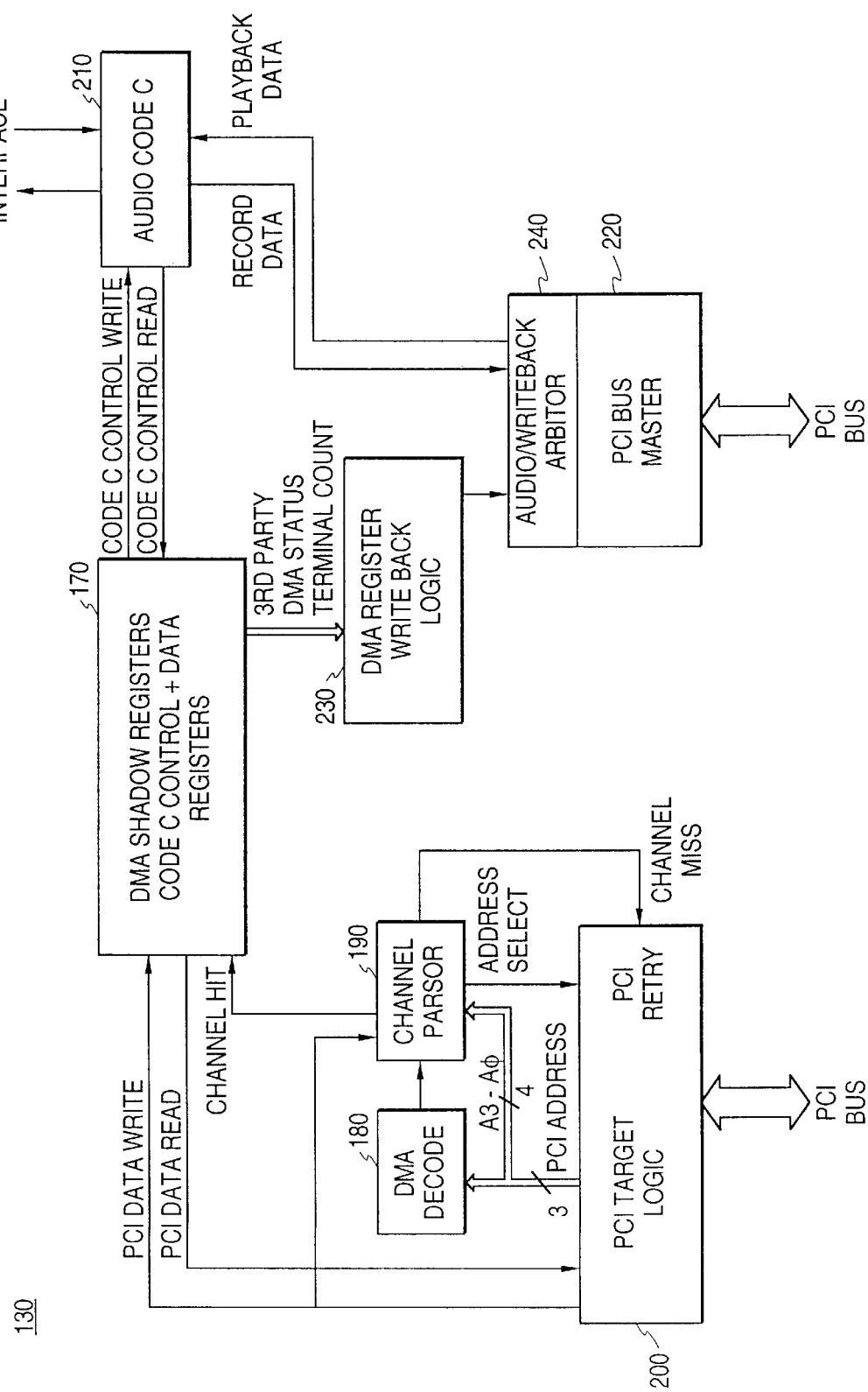
FIG. 2 is a functional block diagram of the virtualizing hardware.

FIG. 2 depicts a functional block diagram of an exemplary implementation of the virtualizing hardware 130 described in connection with FIG. 1.

When an access cycle goes unclaimed on the PCI Bus 110 and is stolen by the virtualized hardware 130, the PCI target logic 160 in FIG. 2 receives the data. PCI target logic 160 interfaces with the PCI bus and divides the address and data from a multiplexed data stream received from the PCI Bus. The PCI data is written to DMA shadow registers and CODEC control and data registers 170 as described below. The CODEC control and data registers control the CODEC (coder/decoder) performance of standard CODEC functions (e.g., record, capture). The DMA shadow registers shadow the third party DMA registers to obtain data including base addresses, counters, status, etc.

DMA decoder 180 handles the address information for the virtualizing hardware 130 by receiving and decoding the high order (A4–A31) bits of the PCI address. In an illustrative embodiment, the virtualized device is the IBM 8237A-5 DMA controller. A channel parsor 190 receives the lower order portion of the address data (A0–A3) to determine for which channel the data is intended. The lower order address data identify the desired channel of the DMA and function to be performed. For example, address lines A0–A3 are examined when an 8237 DMA controller is being virtualized. An address select signal determines whether the channel parsed out corresponds with channel being virtualized. The channel parsor is typically programmed by, for example a plug and play BIOS or via utilities, to identify the virtualized channel.

If the channel is not the channel being virtualized, or otherwise contains irrelevant data (e.g., mask data or data from mask register), channel parsor 190 generates a channel miss signal. PCI write data from the PCI data write line via PCI target logic is input to channel parsor 190 which determine whether the data is desired (relevant). PCI target logic 160 receives the channel miss and requests a PCI retry by informing the PCI bus. During the retry, the virtualizing hardware 130 does not claim the access cycle.

If channel parsor 190 determines that the channel corresponds to a channel being shadowed (a virtualized channel), a channel hit signal is issued. DMA shadow registers 170 receive the channel hit signal which permits the PCI data on the PCI data write line to be written to or captured by the shadow registers 170. Also, if information is to be read out of the virtualizing hardware 130, the channel hit signal triggers information to be read out of the DMA shadow registers 170 onto the PCI data read line and passed through the PCI target logic 160 to the PCI bus.

In an exemplary embodiment, coupled to the DMA shadow register and CODEC control and data registers 170 is an audio CODEC 210 which is a bus master device. The audio CODEC is coupled to PCI bus master 220 and provides standard data record and playback functions. Optionally, DMA register write back logic 230 can be coupled to the PCI bus master 220. Interposed between the PCI bus master 220 and audio CODEC 210, and the PCI bus master 220 and DMA register write back logic 230 is audio/write back arbitor 240. The arbitor 240 is used when there are two sources of data.

DMA shadow registers 170 provides a third party DMA status terminal count to the DMA register write back logic 230. DMA register write back logic 230 writes data back to the virtualized device (e.g., the 8237) such as the terminal count when necessary. The DMA register write back logic 230 can change the terminal count register for the virtualized device. This may be necessary to complete the operation so that the entire system including the virtualized device acts as if the virtualized device has performed.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A computer system comprising:

a host processor;

a PCI bus;

an ISA bus;

a first bridge for coupling said host processor and said PCI bus;

a second bridge for coupling said PCI bus and said ISA bus;

a peripheral coupled to said ISA bus, said peripheral not supported by said PCI bus;

virtualizing hardware coupled to said PCI bus for allowing said peripheral to operate compatibly with said PCI bus; and an expansion board, coupled to said virtualizing hardware, including a sound card, said sound card and said virtualizing hardware being on a single integrated circuit chip.

2. The computer system according to claim 1, further comprising system memory coupled to said host processor, wherein said virtualizing hardware is a PCI bus master which emulates the operation of a direct memory access controller and transfers data to/from said sound card to/from said system memory.

3. A computer system comprising:

a host processor;

a PCI bus;

an ISA bus;

a first bridge for coupling said host processor and said PCI bus;

a second bridge for coupling said PCI bus and said ISA bus;

a peripheral coupled to said ISA bus, said peripheral not supported by said PCI bus; and virtualizing hardware coupled to said PCI bus for allowing said peripheral to operate compatibly with said PCI bus, wherein said second bridge uses subtractive decoding to bridge said PCI bus to said ISA bus.

4. A computer system comprising:

a host processor;

a bus;

a bridge for coupling said host processor to said bus; and virtualizing hardware coupled to said bus for trapping access requests by said host processor to a device not supported on said bus, wherein said virtualizing hardware is located on a sound card, said sound card being incompatible with said bus.

5. The computer system according to claim 4, further comprising system memory coupled to said host processor, wherein said virtualizing hardware is a bus master which emulates the operation of a direct memory access controller and transfers data to/from said sound card to/from said system memory.

6. A method for virtualizing a device not supported by a first bus in a computer system, said computer system including a host processor, a first bridge for coupling said host processor to said first bus, virtualizing hardware located on said first bus, a second bus which supports said device not supported by said first bus, and a second bridge for coupling said first bus to said second bus, said method comprising the steps of:

said host processor initiating an access cycle;

determining whether said access cycle is intended for a device coupled to said first bus;

said virtualizing hardware claiming the access cycle when no device coupled to said first bus claims the access cycle; and said virtualizing hardware examining the access cycle to determine whether the access cycle is for the device not supported by said first bus, wherein if the access cycle is not for the device not supported by said first bus, issuing a retry for the access cycle on said first bus, and passing the access cycle to said second bridge and to said second bus, and wherein if the access cycle is for the device not supported by said first bus, said virtualizing hardware using information associated with the access cycle to emulate the operation of the device not supported by said first bus.

7. The method of claim 6, wherein said first bus is a PCI bus and said second bus is an ISA bus.

8. The method of claim 7, wherein the device not supported by said first bus is a direct memory access controller.

* * * * *